United States Patent
Lee et al.

(10) Patent No.: US 10,276,894 B2
(45) Date of Patent: Apr. 30, 2019

(54) NON-AQUEOUS LIQUID ELECTROLYTE AND LITHIUM SECONDARY BATTERY COMPRISING THE SAME

(71) Applicant: LG Chem, Ltd., Seoul (KR)

(72) Inventors: Chul Haeng Lee, Daejeon (KR); Shul Kee Kim, Daejeon (KR); Gwang Yeon Kim, Daejeon (KR); Doo Kyung Yang, Daejeon (KR)

(73) Assignee: LG Chem, Ltd. (KR)

( * ) Notice: Subject to any disclaimer, the term of this patent is extended or adjusted under 35 U.S.C. 154(b) by 225 days.

(21) Appl. No.: 15/107,684

(22) PCT Filed: Sep. 25, 2015

(86) PCT No.: PCT/KR2015/010214
§ 371 (c)(1),
(2) Date: Jun. 23, 2016

(87) PCT Pub. No.: WO2016/048093
PCT Pub. Date: Mar. 31, 2016

(65) Prior Publication Data
US 2016/0329600 A1    Nov. 10, 2016

(30) Foreign Application Priority Data

Sep. 26, 2014 (KR) .................. 10-2014-0128878

(51) Int. Cl.
| | |
|---|---|
| *H01M 10/0567* | (2010.01) |
| *H01M 4/505* | (2010.01) |
| *H01M 4/525* | (2010.01) |
| *H01M 10/0568* | (2010.01) |
| *H01M 4/04* | (2006.01) |
| *H01M 4/62* | (2006.01) |
| *H01M 4/66* | (2006.01) |
| *H01M 10/0525* | (2010.01) |
| *H01M 10/0569* | (2010.01) |
| *H01M 4/02* | (2006.01) |

(52) U.S. Cl.
CPC ..... *H01M 10/0567* (2013.01); *H01M 4/0435* (2013.01); *H01M 4/505* (2013.01); *H01M 4/525* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 2004/028* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 2002/0086210 A1 | 7/2002 | Naruoka et al. | |
| 2009/0162751 A1* | 6/2009 | Honbo | H01M 4/131 429/223 |
| 2012/0244425 A1* | 9/2012 | Tokuda | H01M 4/5825 429/199 |
| 2012/0258357 A1 | 10/2012 | Kim | |
| 2012/0316716 A1* | 12/2012 | Odani | H01M 10/0567 701/22 |
| 2013/0149608 A1 | 6/2013 | Kim et al. | |
| 2013/0330609 A1 | 12/2013 | Sawa et al. | |
| 2013/0330610 A1 | 12/2013 | Shigematsu et al. | |
| 2014/0134501 A1 | 5/2014 | Li et al. | |
| 2014/0186722 A1 | 7/2014 | Lim et al. | |
| 2015/0249269 A1 | 9/2015 | Yoon et al. | |
| 2015/0380768 A1 | 12/2015 | Mizuno et al. | |
| 2016/0028119 A1* | 1/2016 | Heishi | H01M 4/505 429/338 |
| 2016/0211553 A1* | 7/2016 | Ito | H01M 10/0567 |
| 2017/0214091 A1 | 7/2017 | Abe et al. | |

FOREIGN PATENT DOCUMENTS

| | | |
|---|---|---|
| CN | 102082296 B | 12/2012 |
| CN | 103762352 A | 4/2014 |
| CN | 104995785 A | 10/2015 |
| CN | 106663838 A | 5/2017 |
| EP | 0944125 A1 | 9/1999 |
| JP | 2002151076 A | 5/2002 |

(Continued)

OTHER PUBLICATIONS

Extended Search Report from European Application No. 15843681.6, dated Jan. 30, 2017.

(Continued)

*Primary Examiner* — Alix E Eggerding
(74) *Attorney, Agent, or Firm* — Lerner, David, Littenberg, Krumholz & Mentlik, LLP

(57) ABSTRACT

The present invention provides a lithium secondary battery comprising a non-aqueous liquid electrolyte comprising lithium bis(fluorosulfonyl)imide (LiFSI) and a fluorinated benzene-based compound as additives, a positive electrode comprising a lithium-nickel-manganese-cobalt-based oxide as a positive electrode active material, a negative electrode, and a separator.

With the non-aqueous liquid electrolyte for a lithium secondary battery of the present invention, a solid SEI film is formed on a negative electrode when initially charging a lithium secondary battery comprising the non-aqueous liquid electrolyte, and an output property of the lithium secondary battery is improved, and an output property and stability after high temperature storage are capable of being enhanced as well.

10 Claims, No Drawings

(56) References Cited

FOREIGN PATENT DOCUMENTS

| | | |
|---|---|---|
| JP | 2004139963 A | 5/2004 |
| JP | 2006236981 A | 9/2006 |
| JP | 2012094454 A | 5/2012 |
| JP | 2012182130 A | 9/2012 |
| JP | 2012190699 A | 10/2012 |
| JP | 2013120752 A | 6/2013 |
| JP | 2014127370 A | 7/2014 |
| JP | WO2016017809 A1 | 5/2017 |
| KR | 20120115839 A | 10/2012 |
| KR | 20140040285 A | 4/2014 |
| KR | 20140066645 A | 6/2014 |
| KR | 20140082573 A | 7/2014 |
| WO | 2012108505 A1 | 8/2012 |
| WO | 2014126256 A1 | 8/2014 |

OTHER PUBLICATIONS

International Search Report from PCT/KR2015/010214, dated Dec. 14, 2015.
Chinese Search Report for Application No. CN201580004429.0 dated Oct. 29, 2018.

\* cited by examiner

NON-AQUEOUS LIQUID ELECTROLYTE AND LITHIUM SECONDARY BATTERY COMPRISING THE SAME

CROSS-REFERENCE TO RELATED APPLICATION

The present application is a national phase entry under 35 U.S.C. § 371 of International Application No. PCT/KR2015/010214, which claims priority from Korean Patent Application No. 10-2014-0128878 filed, Sep. 26, 2014, all of which are incorporated herein by reference.

TECHNICAL FIELD

The present invention relates to a lithium secondary battery comprising a non-aqueous liquid electrolyte comprising lithium bis(fluorosulfonyl)imide (LiFSI) and a fluorinated benzene-based compound as additives, a positive electrode comprising a lithium-nickel-manganese-cobalt-based oxide as a positive electrode active material, a negative electrode and a separator.

BACKGROUND ART

With increases in technology developments and demands for mobile devices, demands for secondary batteries as an energy source have rapidly increased, and among such secondary batteries, lithium secondary batteries having high energy density and voltage have been commercialized and widely used.

In a lithium secondary battery, lithium metal oxides are used as a positive electrode active material, and lithium metal, lithium alloys, crystalline and amorphous carbon or carbon complexes are used as a negative electrode active material. A secondary battery is manufactured by coating the active material on a collector to suitable thickness and length or coating the active material itself in a film form, and winding or laminating the active material with a separator that is an insulator to form an electrode group, placing the result in a can or a container similar thereto, and then injecting a liquid electrolyte.

Such a lithium secondary battery experiences charge and discharge while repeating intercalation and deintercalation of lithium ions from a lithium metal oxide of a positive electrode to a graphite electrode of a negative electrode. Herein, the lithium reacts with a carbon electrode due to high reactivity, and forms a film on the negative electrode surface by producing $Li_2CO_3$, LiO, LiOH and the like. Such a film is referred to as a solid electrolyte interface (SEI) film, and the SEI film formed at the beginning of charge prevents a reaction of lithium ions with a carbon negative electrode or other materials while charging and discharging. In addition, the SEI film performs a role of an ion tunnel and passes only lithium ions. This ion tunnel solvates lithium ions and performs a role of preventing the collapse of the carbon negative electrode structure by a high molecular weight organic solvent of a liquid electrolyte moving together being co-intercalated to the carbon negative electrode.

Accordingly, a solid SEI film needs to be formed on a negative electrode of a lithium secondary battery in order to enhance a high temperature cycle and a low temperature output of the lithium secondary battery. Once the SEI film is formed at the initial charge, the film prevents reaction of lithium ions with a negative electrode or other materials when repeating charge and discharge by battery use thereafter, and performs a role of an ion tunnel between a liquid electrolyte and a negative electrode passing only lithium ions.

In existing technologies, a low temperature output property enhancement has been difficult to be expected in a liquid electrolyte that does not comprise liquid electrolyte additives or comprises electrolyte additives having poor properties due to the formation of a non-uniform SEI film. Moreover, even when liquid electrode additives are included but the amounts of the additives to be added are not adjusted to required amounts, there is a problem in that a positive electrode surface is decomposed in a high temperature reaction due to the liquid electrolyte additives, or the liquid electrolyte causes an oxidation reaction and ultimately, irreversible capacity of a secondary battery increases and an output property declines.

DISCLOSURE OF THE INVENTION

Technical Problem

An aspect of the present invention provides a non-aqueous liquid electrolyte for a lithium secondary battery capable of not only improving low temperature and room temperature output properties, but also enhancing a high temperature storage property, a capacity property and stability, and a lithium secondary battery comprising the same.

Technical Solution

According to an aspect of the present invention, there is provided a lithium secondary battery comprising a non-aqueous liquid electrolyte comprising lithium bis(fluorosulfonyl)imide (LiFSI) and a fluorinated benzene-based compound as additives, a positive electrode comprising a lithium-nickel-manganese-cobalt-based oxide as a positive electrode active material, a negative electrode and a separator.

The non-aqueous liquid electrolyte may further comprise a lithium salt, and a mixing ratio of the lithium salt and the lithium bis(fluorosulfonyl)imide is 1:0.01 to 1:1 as a molar ratio, and the lithium bis(fluorosulfonyl)imide has a concentration of 0.01 mol/L to 2 mol/L in the non-aqueous liquid electrolyte.

The lithium-nickel-manganese-cobalt-based oxide may comprise an oxide represented by the following Chemical Formula 1.

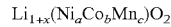  [Chemical Formula 1]

$Li_{1+x}(Ni_aCo_bMn_c)O_2$

Wherein, 0.55≤a≤0.65, 0.18≤b≤0.22, 0.18≤c≤0.22, −0.2≤x≤0.2, and x+a+b+c=1.

Advantageous Effects

With a non-aqueous liquid electrolyte for a lithium secondary battery of the present invention, and a secondary battery comprising the same, a solid SEI film is formed on negative electrode when initially charging the lithium secondary battery comprising the non-aqueous liquid electrolyte, and gas generation is suppressed under a high temperature environment, which minimizes a battery thickness increase, and by preventing decomposition of a positive electrode surface and an oxidation reaction of the liquid electrolyte, an output property of the lithium secondary battery is improved, and an output property and stability after high temperature storage are capable of being enhanced as well.

BEST MODE FOR CARRYING OUT THE INVENTION

Hereinafter, the present invention will be described in more detail in order to illuminate the present invention. Terms or words used in the present specification and the claims are not to be interpreted limitedly as common or dictionary definitions, and shall be interpreted as meanings and concepts corresponding to technological ideas of the present invention based on a principle in which the inventors may suitably define the concepts of terms in order to describe the invention in the best possible way.

A non-aqueous liquid electrolyte according to an embodiment of the present invention comprises lithium bis(fluorosulfonyl)imide (LiSi).

The lithium bis(fluorosulfonyl)imide is added to a non-aqueous liquid electrolyte as a lithium salt, and not only improves a low temperature output property by forming a solid and thin SEI membrane on a negative electrode, but suppresses decomposition of a positive electrode surface, which may occur in a high temperature cycle operation, and prevents an oxidation reaction of the liquid electrolyte. Moreover, the SEI film formed on the negative electrode has a small thickness, and lithium ion migration the negative electrode may be smoother, and accordingly, secondary battery output is capable of being enhanced.

According to an embodiment of the present invention, the lithium bis(fluorosulfonyl)imide preferably has a concentration of 0.01 mol/L to 2 mol/L in the non-aqueous liquid electrolyte, and more preferably 0.01 mol/L to 1 mol/L. When the concentration of the lithium bis(fluorosulfonyl)imide is less than 0.1 mol/L, improving effects of low temperature output and high temperature cycle properties of a lithium secondary battery are insignificant, and when the concentration of the lithium bis(fluorosulfonyl)imide is greater than 2 mol/L, a side reaction in the liquid electrolyte excessively occurs when charging and discharging a battery causing a swelling phenomenon, and corrosion of a positive electrode or negative electrode collector made of metals may be induced in the liquid electrolyte.

In order to prevent such a side reaction, the non-aqueous liquid electrolyte of the present invention may further comprise a lithium salt. As the lithium salt, lithium salts commonly used in the art may be used, and examples thereof may comprise any one or a mixture of at least two selected from the group consisting of $LiPF_6$, $LiAsF_6$, $LiCF_3SO_3$, $LiBF_4$, $LiSbF_6$, $LiN(C_2F_5SO_2)_2$, $LiAlO_4$, $LiAlCl_4$, $LiSO_3CF_3$ and $LiClO_4$.

A mixing ratio of the lithium salt and the lithium bis(fluorosulfonyl)imide is preferably 1:0.01 to 1 as a molar ratio. When the mixing ratio of the lithium salt and the lithium bis(fluorosulfonyl)imide is greater than the above-mentioned molar ratio range, a side reaction in the liquid electrolyte excessively occurs when charging and discharging a battery causing a swelling phenomenon, and when the mixing ratio is less than the above-mentioned molar ratio, output enhancement of a secondary battery produced may be reduced. Specifically, when the mixing ratio of the lithium salt and the lithium bis(fluorosulfonyl)imide is less than 1:0.01 as a molar ratio, irreversible reactions may occur a lot during a process forming an SEI film in a lithium ion battery and during a process inserting lithium ions solvated by a carbonate-based solvent between negative electrodes, and as a result, an improvement in the low temperature output, and effects of improving a cycle property and a capacity property after high temperature storage of a secondary battery may be insignificant by the stripping of a negative electrode surface layer (for example, carbon surface layer) and decomposition of a liquid electrolyte. When the mixing ratio of the lithium salt and the lithium bis(fluorosulfonyl)imide is greater than 1:1 as a molar ratio, an excessive amount of the lithium bis(fluorosulfonyl)imide is included in the liquid electrolyte, which may cause corrosion of an electrode collector while progressing charge and discharge, and thereby may affect stability of a secondary battery.

The positive electrode active material that is a lithium-nickel-manganese-cobalt-based oxide may comprise an oxide represented by the following Chemical Formula 1.

$$Li_{1+x}(Ni_aCo_bMn_c)O_2 \qquad \text{[Chemical Formula 1]}$$

(In the formula, $0.55 \leq a \leq 0.65$, $0.18 \leq b \leq 0.22$, $0.18 \leq c \leq 0.22$, $-0.2 \leq x \leq 0.2$, and $x+a+b+c=1$.)

By using the positive electrode active material that is a lithium-nickel-manganese-cobalt-based oxide in a positive electrode, a synergistic effect may be obtained combining the positive electrode active material with the lithium bis(fluorosulfonyl)imide. In the lithium-nickel-manganese-cobalt-based oxide positive electrode active material, a cation mixing phenomenon in which sites of monovalent Li ions and divalent Ni ions in the layer structure of the positive electrode active material are switched during a charging and discharging process as the Ni content increases in the transition metal, which leads to the collapse of the structure, and as a result, the positive electrode active material produces a side reaction with a liquid electrolyte, or elution of transition metals and the like occur. This occurs since ion sizes of monovalent Li ions and divalent Ni ions are similar. Consequently, the liquid electrolyte in the secondary battery is depleted and the structure of the positive electrode active material is collapsed through the side reaction, and as a result, battery performance readily declines.

In view of the above, by using a LiFSI-applied liquid electrolyte to the positive electrode active material of Chemical Formula 1 according to an embodiment of the present invention and forming a layer on the positive electrode surface using components derived from the LiFSI, a range capable of securing a sufficient nickel transition metal amount to secure a positive electrode active material capacity while suppressing cation mixing of monovalent Li ions and divalent Ni ions has been found. With the positive electrode active material comprising the oxide according to Chemical Formula 1 of the present invention, a side reaction with a liquid electrolyte, metal elution and the like may be effectively suppressed when using the LiFSI-applied liquid electrolyte.

Particularly, when a Ni transition metal ratio is greater than 0.65 in the oxide represented by Chemical Formula 1, cation mixing of monovalent Li ions and divalent Ni ions may not be suppressed even by the layer produced with the LiFSI at the electrode surface described above since excess Ni is included in the positive electrode active material.

In addition, when excess Ni transition metal is included in the positive electrode active material, the nickel transition metal, which has a d-orbital under a high temperature environment and the like and needs to have a regular octahedron structure when coordinate bonding, forms a twisted octahedron since the order of energy levels is switched by external energy supply or the oxidation state changes (non-uniform reaction) due to a Ni oxidation state change. As a result, a crystal structure of the positive electrode active material comprising the nickel transition metal is changed, and probability of nickel metal elution in the positive electrode active material increases.

Consequently, the inventors of the present invention have identified that combining a LiFSI salt and a positive electrode active material comprising an oxide in the scope of Chemical Formula 1 exhibits excellent efficiency in an output property and a capacity property while producing a high output.

In addition, the liquid electrolyte additive according to an embodiment of the present invention may comprise a fluorinated benzene-based compound. Specifically, the compound may be one or more selected from the group consisting of compounds represented by the following Chemical Formula 2.

[Chemical Formula 2]

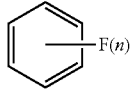

Herein, n is an integer of 1 to 3.

Specifically, the fluorinated benzene-based compound may be one or more selected from the group consisting of fluorobenzene, difluorobenzene, trifluorobenzene and derivatives thereof, and according to one embodiment of the present invention, the fluorinated benzene-based compound may be 1,3,6-trifluorobenzene.

In a lithium secondary battery, oxygen released from a positive electrode under a high temperature environment facilitates an exothermic decomposition reaction of a liquid electrolyte solvent inducing swelling of the battery, and as a result, a lifespan and charge and discharge efficiency of the battery rapidly decrease, and in some cases, battery safety significantly drops such that the battery explodes. In the fluorinated benzene-based compound, the fluoro substituent is a flame retarding compound and, by being added to a liquid electrolyte, is capable of suppressing gas generated from the decomposition of the liquid electrolyte occurring from the reaction of negative electrode and positive electrode surfaces with the liquid electrolyte at high temperatures in the battery. Accordingly, by adding the fluorinated benzene-based compound according to an embodiment of the present invention, lifespan and storage properties at high temperatures are capable of being enhanced, and stability of a secondary battery may increase by reducing the possibility of ignition during a nail test.

Herein, content of the fluorinated benzene-based compound is not limited as long as it is an amount needed to accomplish effects of the present invention such as high temperature storage output and stability enhancement of a battery, and examples thereof may be from 1% by weight to 20% by weight based on the total weight of the liquid electrolyte, and preferably from 3.0% by weight to 15% by weight. When the amount of the fluorinated benzene-based compound is less than 1% by weight, effects of gas generation suppress and flame retardancy are not sufficiently obtained with the addition, and when the amount of the fluorinated benzene-based compound is greater than 20% by weight, problems such as an irreversible capacity increase or a negative electrode resistance increase may occur while the degree of effect enhancement is limited. Particularly, the fluorinated benzene-based compound may be controlled depending on the amount of the lithium bis(fluorosulfonyl) imide added. This is for more efficiently preventing a side reaction that may occur with the addition of large quantities of the lithium bis(fluorosulfonyl)imide.

In addition, the non-aqueous liquid electrolyte comprises a non-aqueous organic solvent, and the non-aqueous organic solvent that may be included in the non-aqueous liquid electrolyte is not limited as long as it minimizes decomposition by an oxidation reaction and the like during a charging and discharging process of a battery, and exhibits target properties with the additives, and examples thereof may comprise a nitrile-based solvent, cyclic carbonate, linear carbonate, ester, ether, ketone or the like. These may be used either alone or as combination of two or more.

The carbonate-based organic solvent may be useful among the organic solvents, and the cyclic carbonate may be one or a mixture of at least two selected from the group consisting of ethylene carbonate (EC), propylene carbonate (PC) and butylene carbonate (BC), and the linear carbonate may be one or a mixture of at least two selected from the group consisting of dimethyl carbonate (DMC), diethyl carbonate (DEC), dipropyl carbonate (CPC), ethylmethyl carbonate (EMC), methylpropyl carbonate (MPC) and ethylpropyl carbonate (EPC).

The nitrile-based solvent may be one or more selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile and 4-fluorophenylacetonitrile, and the non-aqueous solvent according to an embodiment of the present invention may use acetonitrile.

Meanwhile, the lithium secondary battery according to an embodiment of the present invention may comprise a positive electrode, a negative electrode, and a separator provided between the positive electrode and the negative electrode, and the non-aqueous liquid electrolyte. The positive electrode and the negative electrode may comprise a positive electrode active material and a negative electrode active material according to one embodiment of the present invention, respectively.

Meanwhile, the negative electrode active material comprises amorphous carbon or crystalline carbon, and specifically, carbon such as hard carbon and graphite-based carbon; metal complex oxides such as $Li_xFe_2O_3$, ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, group 1, group 2 and group 3 elements in the periodic table, halogen; $0 < x \leq 1$; $1 \leq y \leq 3$; $1 \leq z \leq 8$); lithium metal; lithium alloys; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials, and the like, may be used.

In addition, the separator may comprise a porous polymer film, for example, a porous polymer film prepared using polyolefin-based polymers such as an ethylene homopolymer, a propylene homopolymer, an ethylene/butene copolymer, an ethylene/hexene copolymer and an ethylene/methacrylate copolymer may be used either alone, or as a lamination of two or more thereof. In addition, common porous non-woven fabric, for example, non-woven fabric made of high melting point-glass fiber, polyethylene terephthalate fiber and the like, may be used, however, the separator is not limited thereto.

The secondary battery may vary comprising a cylinder-type, a square-type, a pouch-type and the like according to executing purposes, and is not limited to the configuration known in the art. The lithium secondary battery according to an embodiment of the present invention may be a pouch-type secondary battery.

MODE OF CARRYING OUT THE INVENTION

Hereinafter, the present invention will be described in more detail with reference to examples and test examples, however, the present invention is not limited to these examples and test examples.

EXAMPLE

Example 1

[Preparation of Liquid Electrolyte]

A non-aqueous liquid electrolyte was prepared by adding a non-aqueous organic solvent having a composition of ethylene carbonate (EC): ethyl methyl carbonate (ENC)=3:7 (volume ratio), 0.9 mol/L of $LiPF_6$ and 0.1 mol/L of lithium bis(fluorosulfonyl)imide based on the total amount of a non-aqueous liquid electrolyte as a lithium salt, and 5% by weight of 1,3,6-trifluorobenzene based on the total weight of the a non-aqueous liquid electrolyte as an additive.

[Preparation of Lithium Secondary Battery]

Positive electrode mixture slurry was prepared by adding 92% by weight of $Li(Ni_{0.6}Co_{0.2}Mn_{0.2})O_2$ as a positive electrode active material, 4% by weight of carbon black as a conductor, 4% by weight of polyvinylidene fluoride (PVdF) as a binder to N-methyl-2-pyrrolidone (NMP), a solvent. The positive electrode mixture slurry was applied on an aluminum (Al) thin film, a positive electrode collector, having a thickness of approximately 20 μm, and the result was dried, and then roll pressed to prepare a positive electrode.

In addition, negative electrode mixture slurry was prepared by adding 96% by weight of carbon powder as a negative electrode active material, 3% by weight of PVdF as a binder, and 1% by weight of carbon black as a conductor to NMP, a solvent. The negative electrode mixture slurry was applied on a copper (Cu) thin film, a negative electrode collector, having a thickness of 10 μm, and the result was dried, and then roll pressed to prepare a negative electrode.

A polymer-type battery was prepared through common method using the positive electrode and the negative electrode prepared as above with a separator formed with 3 layers of polypropylene/polyethylene/polypropylene (PP/PE/PP), and preparation of a lithium secondary battery as completed by injecting the prepared non-aqueous liquid electrolyte to the polymer-type battery.

Example 2

A non-aqueous liquid electrolyte and a lithium secondary battery were prepared in the same manner as in Example 1 except that, as the lithium salt, 0.7 mol/L of $LiPF_6$ and 0.3 mol/L of lithium bis(fluorosulfonyl)imide were used based on the total weight of the non-aqueous liquid electrolyte.

Example 3

A non-aqueous liquid electrolyte and a lithium secondary battery were prepared in the same manner as in Example 1 except that, as the lithium salt, 0.6 mol/L of $LiPF_6$ and 0.4 mol/L of lithium bis(fluorosulfonyl)imide were used based on the total weight of the non-aqueous liquid electrolyte.

Example 4

A non-aqueous liquid electrolyte and a lithium secondary battery were prepared in the same manner as in Example 1 except that, as the lithium salt, 0.5 mol/L of $LiPF_6$ and 0.5 mol/L of lithium bis(fluorosulfonyl)imide were used based on the total weight of the non-aqueous liquid electrolyte.

Comparative Example 1

A non-aqueous liquid electrolyte and a lithium secondary battery were prepared in the same manner as in Example 1 except that, as the lithium salt, 0.4 mol/L of $LiPF_6$ and 0.6 mol/L of lithium bis(fluorosulfonyl)imide were used based on the total weight of the non-aqueous liquid electrolyte.

Comparative Example 2

A non-aqueous liquid electrolyte and a lithium secondary battery were prepared in the same manner as in Example 2 except that the above-mentioned additives were not used.

Comparative Example 3

A non-aqueous liquid electrolyte and a lithium secondary battery were prepared in the same manner as in Example 2 except that $Li(Ni_{0.5}Co_{0.3}Mn_{0.2})O_2$ was used as the positive electrode active material.

Test Example

<Low Temperature Output Property>

Outputs were calculated using a voltage difference generated when charging and discharging the secondary batteries prepared in Examples 1 to 4 and Comparative Examples 1 to 3 for 10 seconds with 0.50 at −30° C. Herein, the output in Comparative Example 1 was 4.18 W. Based on Comparative Example 1, outputs of Examples 1 to 4 and Comparative Examples 2 and 3 were calculated as percentages. The results are listed in the following Table 1. The tests were carried out at a 50% state of charge (SOC).

<Room Temperature Output Property>

Outputs were calculated using a voltage difference generated when charging and discharging the secondary batteries prepared in Examples 1 to 4 and Comparative Examples 1 to 3 for 10 seconds with 0.5 C at 23° C. Herein, the output in Comparative Example 1 was 45.9 W. Based on Comparative Example 1, outputs of Examples 1 to 4 and Comparative Examples 2 and 3 were calculated as percentages. The results are listed in the following Table 1. The tests were carried out at a 50% state of charge (SOC).

<High Temperature Lifespan Property>

The lithium secondary batteries of Examples 1 to 4 and Comparative Examples 1 to 3 were charged up to 4.2 V/38 mA with 1 C under a constant current/constant voltage (CC/CV) condition at 45° C., and then discharged down to 2.5 V with 3 under a constant current (CC) condition, and the discharge capacity was measured. This was repeated by 1 to 800 cycles, and discharge capacity measured by calculating the $800^{th}$ cycle as a percentage based on the $1^{st}$ cycle (capacity at $800^{th}$ cycle/capacity at $1^{st}$ cycle*100(%)) was shown in Table 1.

<Capacity Property After High Temperature Storage>

The lithium secondary batteries of Examples 1 to 4 and Comparative Examples 1 to 3 were charged up to 4.2 V/38 mA with 1 C under a constant current/constant voltage (CC/CV) condition, and then discharged down to 2.5 V with 3 C under constant current (CC) condition, and the discharge capacity was measured. Then, the secondary batteries prepared in Examples 1 to 4 and Comparative Examples 1 to 3 were stored for 20 weeks at 60° C., the secondary batteries were each charged again up to 4.2 V/38 mA with 1 C under a constant current/constant voltage (CC/CV) condition at 23° C., and then discharged down to 2.5 V with 3 C under a constant current (CC) condition, and the discharge capacity was measured. Results measured by calculating the discharge capacity after 20 weeks based on the initial discharge capacity (discharge capacity after 20 weeks/initial discharge capacity*100(%)) were listed in the following Table 1.

<Nail Test>

The secondary batteries prepared in Examples 2 and 4 and Comparative Examples 1 and 2 were charged up to 4.2 V, and then a nail test penetrating a nail through the battery at a rate of 1 m/min was carried out in order to evaluate safety, and, a temperature increase of the battery was checked by attaching a thermocouple to the battery. The maximally elevated temperature of the battery in each nail test is listed in the following Table 1.

TABLE 1

|  | Low Temperature Output (%) Compared to Comparative Example 1 | Room Temperature Output (%) Compared to Comparative Example 1 | High Temperature Property | | Temperature Elevated in Nail Test (° C.) |
|---|---|---|---|---|---|
|  |  |  | Lifespan Property (%) | Capacity Property (%) |  |
| Example 1 | 3.34 | 1.25 | 81 | 89.6 | — |
| Example 2 | 4.98 | 3.4 | 83.9 | 93.4 | 37 |
| Example 3 | 4.31 | 2.87 | 82.1 | 90.2 | — |
| Example 4 | 3.78 | 1.69 | 81.6 | 90.4 | 34 |
| Comparative Example 1 | — | — | 80.4 | 88.2 | 38 |
| Comparative Example 2 | −8.61 | −4.82 | 77.2 | 91.6 | 102 |
| Comparative Example 3 | −4.72 | −3.94 | 73.5 | 83.7 | — |

As shown in Table 1, it was identified that the secondary batteries of Examples 1 to 4 exhibited excellent outputs in the low temperature and the room temperature outputs by approximately 8% maximum compared to the secondary batteries of Comparative Examples 1 to 3. Particularly, it was identified that the secondary batteries of Examples 1 to 4 had increased stability at high temperatures by using a fluorinated benzene-based compound as an additive, and also exhibited superior effects in properties (capacity and lifespan properties) after high temperature storage compared to the secondary batteries of Comparative Examples 1 to 3 by combining the fluorinated benzene-based compound with LiFSI, a lithium salt.

In a nail test, a nail penetrates into a battery tearing a separator, and large quantities of current flows the moment a positive electrode and a negative electrode are shorted causing a momentary temperature increase, and in severe cases, ignition or explosion occurs. As shown in Table 1, the batteries prepared in Examples 2 and 4 and Comparative Example 1 adding a fluorinated benzene-based compound had a maximum battery temperature of 34° C. to 38° C. and suppressed the temperature elevating to higher than a normal working temperature of the battery, compared to the battery prepared in Comparative Example 2. However, it was seen that the battery of Comparative Example had the highest elevated temperature depending on the LiFSI ratio. Accordingly, it was seen that the secondary batteries in the scope of the present invention had most efficiently enhanced safety.

What is claimed is:

1. A lithium secondary battery comprising:
   a non-aqueous liquid electrolyte comprising a lithium salt, and lithium bis(fluorosulfonyl)imide (LiFSI) and a fluorinated benzene-based compound as additives, wherein a molar ratio of the lithium salt and the LiFSI ranges from 1:0.01 to 1:1;
   a positive electrode comprising a positive electrode active material, wherein the positive electrode active material consists of a lithium-nickel-manganese-cobalt-based oxide;
   a negative electrode; and
   a separator, wherein the lithium-nickel-manganese-cobalt-based oxide is represented by the following Chemical Formula 1:

$Li_{1+x}(Ni_aCo_bMn_c)O_2$  [Chemical Formula 1]

wherein, $0.55 \leq a \leq 0.65$, $0.18 \leq b \leq 0.22$, $0.18 \leq c \leq 0.22$, $-0.2 \leq x \leq 0.2$, and $x+a+b+c=1$.

2. The lithium secondary battery of claim 1, wherein the lithium bis(fluorosulfonyl)imide has a concentration of 0.01 mol/L to 2 mol/L in the non-aqueous liquid electrolyte.

3. The lithium secondary battery of claim 1, wherein the lithium salt comprises any one or a mixture of at least two selected from the group consisting of $LiPF_6$, $LiAsF_6$, $LiCF_3SO_3$, $LiN(CF_3SO_2)_2$, $LiBF_4$, $LiSbF_6$, $LiN(C_2F_5SO_2)_2$, $LiAlO_4$, $LiAlCl_4$, $LiSO_3CF_3$ and $LiClO_4$.

4. The lithium secondary battery of claim 1, wherein the fluorinated benzene-based compound is one or more selected from the group consisting of compounds represented by Chemical Formula 2:

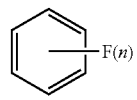

[Chemical Formula 2]

wherein, n is an integer of 1 to 3.

5. The lithium secondary battery of claim 1, wherein the fluorinated benzene-based compound is one or more selected from the group consisting of fluorobenzene, difluorobenzene, trifluorobenzene and derivatives thereof.

6. The lithium secondary battery of claim 1, wherein content of the fluorinated benzene-based compound is from 1% by weight to 20% by weight based on a total weight of the non-aqueous liquid electrolyte.

7. The lithium secondary battery of claim 1, wherein the non-aqueous liquid electrolyte comprises a non-aqueous organic solvent, and the non-aqueous organic solvent comprises a nitrile-based solvent, linear carbonate, cyclic carbonate, ester, ether, ketone or combinations thereof.

8. The lithium secondary battery of claim 7, wherein the cyclic carbonate is any one selected or a mixture of at least two from the group consisting of ethylene carbonate (EC), propylenecarbonate (PC) and butylene carbonate (BC), and the linear carbonate is any one or a mixture of at least two selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC).

9. The lithium secondary battery of claim 7, wherein the nitrile-based solvent is one or more selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile and 4-fluorophenylacetonitrile.

10. The lithium secondary battery of claim 1, which is a pouch-type lithium secondary battery.

* * * * *